United States Patent
Gutta et al.

(10) Patent No.: US 9,695,854 B2
(45) Date of Patent: Jul. 4, 2017

(54) ADJUSTABLE AND LOCKABLE TURNBUCKLE

(71) Applicant: General Electric Company, Schenectady, NY (US)

(72) Inventors: Michael James Gutta, Greenville, SC (US); Mark Joseph Pombles, Highland Heights, KY (US); Harry McFarland Jarrett, Jr., Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 839 days.

(21) Appl. No.: 13/967,779

(22) Filed: Aug. 15, 2013

(65) Prior Publication Data

US 2015/0050122 A1 Feb. 19, 2015

(51) Int. Cl.
*F16B 7/06* (2006.01)
*F01D 25/28* (2006.01)
*F02C 7/20* (2006.01)

(52) U.S. Cl.
CPC .............. *F16B 7/06* (2013.01); *F01D 25/28* (2013.01); *F02C 7/20* (2013.01); *F05D 2260/50* (2013.01); *Y10T 29/49238* (2015.01); *Y10T 403/295* (2015.01)

(58) Field of Classification Search
CPC .............. Y10T 403/29; Y10T 403/291; Y10T 403/293; Y10T 403/295; Y10T 403/297; Y10T 403/299; Y10T 403/32459; Y10T 403/32508; Y10T 403/7079; Y10T 403/7084; Y10T 403/7086; Y10T 403/7088; Y10T 403/75; F16B 7/06; F02C 7/20; F05D 2260/50; F16D 25/166
See application file for complete search history.

(56) References Cited

U.S. PATENT DOCUMENTS

| | | | | |
|---|---|---|---|---|
| 1,016,835 A | * | 2/1912 | Levy-Mourice | F16G 11/12 403/46 |
| 1,110,201 A | * | 9/1914 | Hardick | F16G 11/12 403/44 |
| 1,265,104 A | * | 5/1918 | Ogden | F16G 11/12 403/46 |
| 2,678,225 A | * | 5/1954 | Wright | F16G 11/12 403/46 |
| 2,678,226 A | * | 5/1954 | Wrigth | F16B 39/16 403/299 |

(Continued)

*Primary Examiner* — Matthieu F Setliff
(74) *Attorney, Agent, or Firm* — Eversheds Sutherland (US) LLP

(57) ABSTRACT

An adjustable and lockable turnbuckle may include an elongated body having internal threading within a first end thereof. The turnbuckle may include a first extension rod having external threading configured to mate with the internal threading at the first end of the elongated body. The turnbuckle may include a first jam nut having internal threading and a skirt. The internal threading of the first jam nut may be configured to mate with the external threading of the first extension rod to tighten the first jam nut against the first end of the elongated body so that the skirt of the first jam nut is positionable about the first end of the elongated body. A first aperture may extend through the elongated body, the first extension rod, and the skirt of the first jam nut. Moreover, a first pin may be positioned within the first aperture.

16 Claims, 2 Drawing Sheets

(56) References Cited

U.S. PATENT DOCUMENTS

| | | | | |
|---|---|---|---|---|
| 3,081,116 | A | * | 3/1963 | Weiner ................. F16G 11/02 403/44 |
| 3,239,930 | A | * | 3/1966 | Violleau ................. B21K 1/56 29/516 |
| 3,454,293 | A | * | 7/1969 | Howlett ................. F16G 11/12 403/320 |
| 4,232,978 | A | * | 11/1980 | Cohen ................. F16B 7/06 403/317 |
| 4,274,754 | A | * | 6/1981 | Cohen ................. F16B 39/04 403/14 |
| 4,560,147 | A | * | 12/1985 | Bowdren ............... B60T 11/04 254/231 |
| 5,004,367 | A | * | 4/1991 | Wood, Jr. ............... B62D 7/20 280/93.511 |
| 5,251,389 | A | * | 10/1993 | Bessey ................. E02F 3/3604 37/379 |
| 5,358,524 | A | * | 10/1994 | Richelsoph ............ A61F 2/4059 403/109.4 |
| 5,429,447 | A | * | 7/1995 | Wood ................. F16B 7/06 403/290 |
| 5,765,957 | A | | 6/1998 | Connell |
| 5,782,078 | A | | 7/1998 | Brantley |
| 6,520,709 | B1 | * | 2/2003 | Mosing ................. B66C 1/66 403/300 |
| 7,249,907 | B2 | | 7/2007 | Kay |
| 2013/0039736 | A1 | | 2/2013 | Waugh |

* cited by examiner

ADJUSTABLE AND LOCKABLE TURNBUCKLE

FIELD

Embodiments of the disclosure relate generally to a turnbuckle and more particularly relate to an adjustable and lockable turnbuckle that may be used in a variable stator vane linkage assembly of a turbomachine or the like.

BACKGROUND

During operation of an axial flow turbomachine, air is continuously induced into a compressor. The air is accelerated by rotating blades and swept rearwards onto adjacent rows of variable stator vanes. Each blade/variable stator vane stage increases the pressure of the air. In some instances, the vane angle of the variable stator vanes may be controlled by a variable stator vane linkage assembly to optimize the efficiency of the compressor.

The variable stator vane linkage assembly may include one or more turnbuckles. Currently, adjustable turnbuckles are used to determine the optimal vane angles during installation and testing. However, once the optimal vane angles are known, the adjustability of the turnbuckles may become a liability. For example, having a turnbuckle with a fixed length prevents undesired modifications in the length of the turnbuckle from occurring during assembly, operation, and/or maintenance of the turbomachine. Small changes in the length of the turnbuckle will lead to undesirable and less optimal compressor vane angles. The compressor vane angle is critical to the compressor pressure ratio and also the efficiency of the turbomachine.

BRIEF DESCRIPTION

Some or all of the above needs and/or problems may be addressed by certain embodiments of the disclosure. According to one embodiment, there is disclosed an adjustable and lockable turnbuckle. The turnbuckle may include an elongated body having internal threading within a first end thereof. The turnbuckle also may include a first extension rod having external threading configured to mate with the internal threading at the first end of the elongated body. Moreover, the turnbuckle may include a first jam nut having internal threading and a skirt. The internal threading of the first jam nut may be configured to mate with the external threading of the first extension rod to tighten the first jam nut against the first end of the elongated body so that the skirt of the first jam nut is positionable about the first end of the elongated body. Further, the turnbuckle may include a first aperture extending through the elongated body, the first extension rod, and the skirt of the first jam nut. A first pin may be positioned within the first aperture.

According to another embodiment, there is disclosed a method to adjust and lock a turnbuckle in a variable stator vane assembly. The method may include adjusting a first extension rod relative to a first end of an elongated body. The method also may include tightening a first jam nut positioned about the first extension rod against the first end of the elongated body so that a skirt of the first jam nut is positioned about the first end of the elongated body. A first aperture may be drilled through the elongated body, the first extension rod, and the skirt of the first jam nut. A first pin may be positioned within the first aperture.

Further, according to another embodiment, there is disclosed a variable stator vane linkage assembly. The variable stator vane linkage assembly may include at least one adjustable and lockable turnbuckle. The turnbuckle may include an elongated body having internal threading within a first end thereof. The turnbuckle also may include a first extension rod having external threading configured to mate with the internal threading at the first end of the elongated body. Moreover, the turnbuckle may include a first jam nut having internal threading and a skirt. The internal threading of the first jam nut may be configured to mate with the external threading of the first extension rod to tighten the first jam nut against the first end of the elongated body so that the skirt of the first jam nut is positionable about the first end of the elongated body. Further, the turnbuckle may include a first aperture extending through the elongated body, the first extension rod, and the skirt of the first jam nut. A first pin may be positioned within the first aperture.

Other embodiments, aspects, and features of the invention will become apparent to those skilled in the art from the following detailed description, the accompanying drawings, and the appended claims.

BRIEF DESCRIPTION OF THE DRAWINGS

Reference will now be made to the accompanying drawings, which are not necessarily drawn to scale.

DETAILED DESCRIPTION

Figure 1:
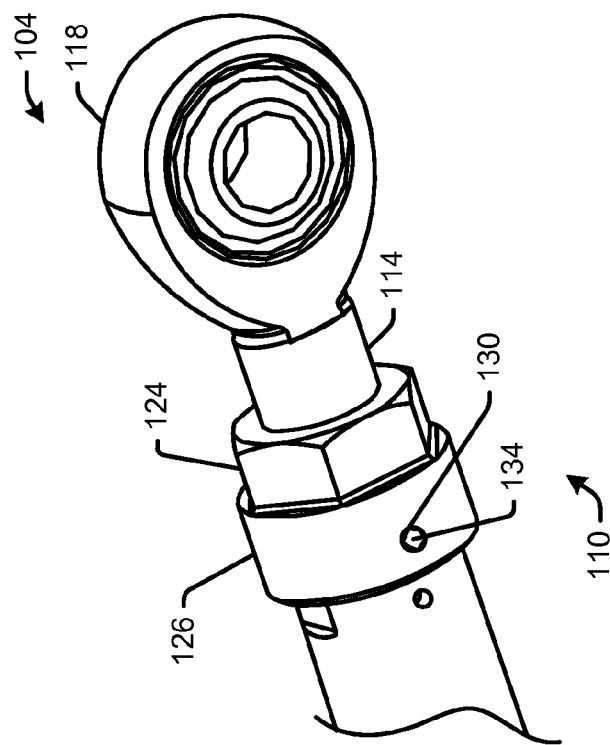
FIG. 1 schematically depicts an example view of an adjustable and lockable turnbuckle, according to an embodiment of the disclosure.
Figure 1:
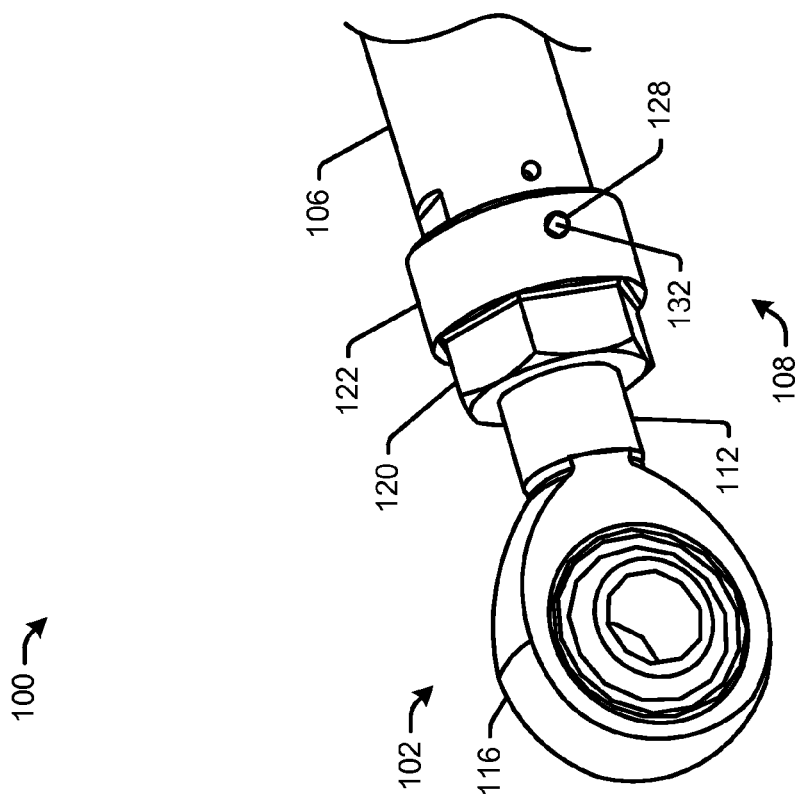

Illustrative embodiments will now be described more fully hereinafter with reference to the accompanying drawings, in which some, but not all embodiments are shown. The disclosure may be embodied in many different forms and should not be construed as limited to the embodiments set forth herein. Like numbers refer to like elements throughout.

An adjustable and lockable turnbuckle is disclosed herein. In some instances, the turnbuckle may be used in a variable stator vane linkage assembly of a turbomachine. Although the turnbuckle is described as being part of a variable stator vane linkage assembly, one of ordinary skill in the art will understand that the turnbuckle may be used in other systems and assemblies. In certain embodiments, the turnbuckle may be used in an axial flow turbomachine, such as, but not limited to, a gas turbine engine, an aircraft engine, a turbojet, a turbofan, a marine gas turbine, an oil & gas pipeline compressor, and/or an industrial gas turbine, etc. That is, the turnbuckle may be used in any turbomachinery application. The turnbuckle also may be incorporated in other systems and assemblies other than turbomachinery. In some instances, the turnbuckle may be adjustable and lockable. For example, the length of the turnbuckle may be shortened or extended. In other instances, the length of the turnbuckle may be fixed (or locked). For example, the length of the turnbuckle may be fixed by the placement of a pin. The adjustable length of the turnbuckle enables more configurations and flexibility. The fixing of the length after the pin is installed provides a more robust design.

The turnbuckle may include an elongated body. In some instances, the elongated body may be cylindrical. The elongated body may include left-hand and right-hand internal threads at either end. Skirted jam nuts may be threaded onto left-hand and right-hand extension rods. The extension rods may be threaded into either end of the elongated body. The length of the turnbuckle may be adjusted by rotating the extension rods within the elongated body. Once the desired length is achieved, the jam nuts may be tightened against the ends of the elongated body to a specified torque. After the jam nuts are tightened, holes may be drilled through the skirt of the jam nuts, the elongated body, and the extension rods. Pins may be press-fit inserted through the holes to prevent the jam nuts from loosening. In some instances, the skirt of the jam nuts may be staked on either side to retain the pins in the holes.

The turnbuckle includes several fail-safe features. Although the jam nuts alone may be sufficient to maintain the correct turnbuckle length, the pins may be used as a redundant anti-rotation feature. The pins may be sized to provide sufficient strength, such as in the event that the jam nuts are not fully tightened, the pins may be of sufficient strength to resist adjustments to the length of the turnbuckle. For example, if a specified torque is applied, the pins may not shear and fail. In some instances, the pins may be spring pins that are press fit into the holes, which may prevent the pins from falling out of the holes due to vibration or motion. Furthermore, the skirt of the jam nuts may be staked on either end of the pins as another feature to prevent the pins from falling out of the holes.

As mentioned above, the adjustable and lockable turnbuckle disclosed herein may be used in a variable stator vane linkage assembly of a turbomachine. Usage of a fixed length turnbuckle eliminates any adjustment of the length of the turnbuckle during operation, outage, or assembly of the gas turbine engine. Having a non-adjustable link provides a more robust system and therefore more determinate vane angles. Using a pin retained by staking instead of an existing lock plate is more robust because it cannot be removed or altered without tools and the intention to destroy the assembly. Lock plates, safety cables, lock wires, castellated nuts, and even welds can be easily compromised. Lock plates and pins from castellated nuts can be easily bent out of place. Safety cables and lock wires can be cut and removed. Welds have been shown to crack under the vibrations, and the heat from a weld can loosen the fit of a tightened jam nut against the elongated body.

FIG. 1 schematically depicts one example embodiment of a turnbuckle 100. The turnbuckle 100 may include a first end 102 and a second end 104. The turnbuckle 100 also may include an elongated body 106. The elongated body 106 may include a first end 108 and a second end 110. The elongated body 106 may be a cylindrical tube or the like. In some instances, the elongated body 106 may be at least partially hollow about the first end 108 and the second end 110. For example, the elongated body 106 may be wholly or partially hollow. The elongated body 106 may be any suitable length or configuration.

A first extension rod 112 may be positioned about the first end 108 of the elongated body 106. The first extension rod 112 may be configured to at least partially extend into the first end 108 of the elongated body 106. In some instances, the first extension rod 112 may be moveable relative to the first end 108 of the elongated body 106. Similarly, a second extension 114 rod may be positioned about the second end 110 of the elongated body 106. The second extension rod 114 may be configured to at least partially extend into the second end 110 of the elongated body 106. In some instances, the second extension rod 114 may be moveable relative to the second end 110 of the elongated body 106.

In certain embodiments, the first extension rod 112 may include a first bearing head 116. Similarly, the second extension rod 114 may include a second bearing head 118. In some instances, the first bearing head 116 and the second bearing head 118 may be configured to be attached to a component of a stator vane linkage assembly. The first bearing head 116 and the second bearing head 118 may be attached to other components and utilized in other systems and assemblies where a turnbuckle may be used.

The turnbuckle 100 may include a first jam nut 120 positioned about the first extension rod 112. The first jam nut 120 may include a skirt 122. The first jam nut 120 may be tightened (or "jammed") against the first end 108 of the elongated body 106 such that the skirt 122 is positioned about the first end 108 of the elongated body 106. The turnbuckle 100 also may include a second jam nut 124 positioned about the second 110 extension rod 106. The second jam nut 124 may include a skirt 126. The second jam nut 124 may be tightened (or "jammed") against the second end 110 of the elongated body 106 such that the skirt 126 is positioned about the second end 110 of the elongated body 106.

The turnbuckle 100 may include a first aperture 128. For example, the first aperture 128 may extend through the first end 108 of the elongated body 106, the first extension rod 112, and the skirt 122 of the first jam nut 120. In some instances, the first aperture 128 may be substantially transverse to the length of the turnbuckle 100. Similarly, the turnbuckle 100 may include a second aperture 130. For example, the second aperture 130 may extend through the second end 110 of the elongated body 106, the second extension rod 114, and the skirt 126 of the second jam nut 124. In some instances, the second aperture 130 may be substantially transverse to the length of the turnbuckle 100.

A first pin 132 may be positioned within the first aperture 128. Similarly, a second pin 134 may be positioned within the second aperture 130. For example, the first pin 132 may be press fit within the first aperture 128, and the second pin 134 may be press fit within the second aperture 130. In some instances, the first pin 132 and the second pin 134 may be dowel pins. In other instances, the first pin 132 and the second pin 134 may be spring pins. In order to prevent the first pin 132 from backing out of the first aperture 128 and the second pin 134 from backing out of the second aperture 130, the skirt 122 of the first jam nut 120 and the skirt 126 of the second jam nut 124 may be staked about the apertures 128, 130 on both sides, respectively. Other components may also be incorporated into the turnbuckle 100 to prevent the pins 132, 134 from backing out of the apertures 128, 130.

Figure 2:
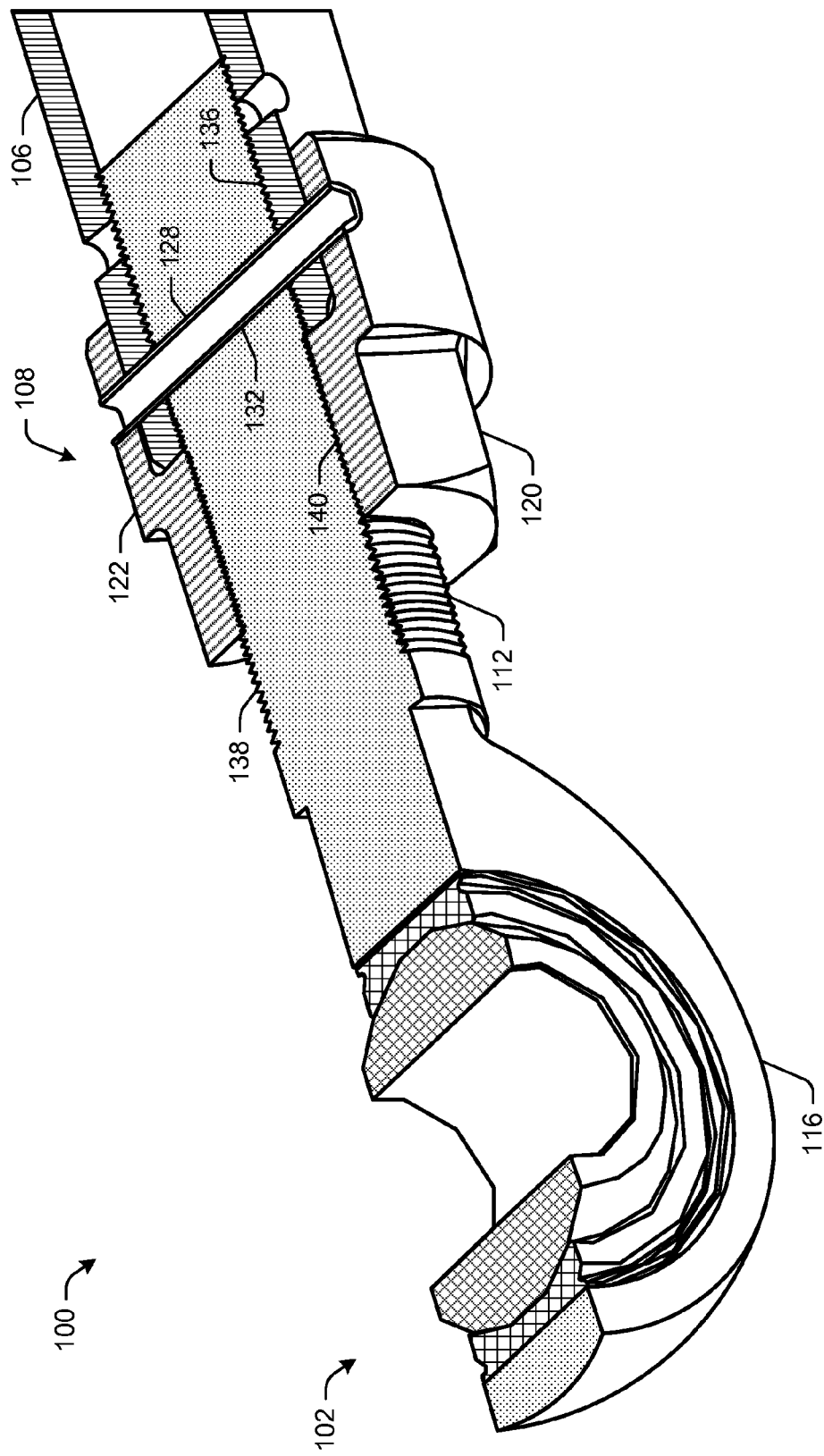
FIG. 2 schematically depicts an example cross-sectional view of an adjustable and lockable turnbuckle, according to an embodiment of the disclosure.

FIG. 2 schematically depicts an example cross-sectional view of the first end 102 of the turnbuckle 100. Although only the first end 102 of the turnbuckle 100 is shown, the second end 104 of the turnbuckle 100 may include a similar configuration. The elongated body 106 may include internal threading 136. The first extension rod 112 may include external threading 138 configured to mate with the internal threading 136 of the elongated body 106. In this manner, the first extension rod 112 may be threaded in and out of the elongated body 106. The first bearing head 116 may be disposed opposite the external threading 138 of the first extension rod 112.

The first jam nut 120 may include internal threading 140. The internal threading 140 of the first jam nut 120 may be configured to mate with the external threading 138 of the first extension rod 112. In this manner, the first jam nut 120 may be threaded up and down the first extension rod 112. In some instances, the first jam nut 120 may be tighten against the first end 108 of the elongated body 106 so that the skirt 122 of the first jam nut 120 is positioned about the first end 108 of the elongated body 106. The first aperture 128 may extend through the first end 108 of elongated body 106, the first extension rod 112, and the skirt 122 of the first jam nut 120. The first pin 132 may be positioned within the first aperture 128. In some instances, the first pin 132 may be permanently positioned within the first aperture 128 after the appropriate length of the turnbuckle 100 is determined. For example, the first pin 132 may be press fit within the first aperture 128, and the skirt 122 of the first jam nut 120 may be staked about the ends of the first pin 132.

In use, the first jam nut 120 may be threaded onto the first extension rod 112. The first extension rod 112 then may be threaded into the first end 108 of the elongated body 106. Once the appropriate length of the turnbuckle 100 is determined, the first jam nut 120 may be tightened against the first end 108 of the elongated body 106. When tightened against the first end 108 of the elongated body 106, the skirt 122 of the first jam nut 120 may be positioned about the first end 108 of the elongated body 106. In some instances, the first aperture 128 may be drilled through the first end 108 of the elongated body 106, the first extension rod 112, and the skirt 122 of the first jam nut 120. The first pin 132 may be positioned within the first aperture 128. For example, the first pin 132 may be press fit within the first aperture 128, and the skirt 122 of the first jam nut 120 may be staked about the ends of the first pin 132.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments.

That which is claimed:

1. An adjustable and lockable turnbuckle in a variable stator vane assembly, comprising:
    an elongated body comprising internal threading within a first end thereof;
    a first extension rod comprising external threading configured to mate with the internal threading at the first end of the elongated body;
    a first jam nut comprising a single component having internal threading and a skirt, wherein the internal threading of the first jam nut is configured to mate with the external threading of the first extension rod to tighten the first jam nut against the first end of the elongated body so that the skirt of the first jam nut is positionable about the first end of the elongated body;
    a first aperture extending completely through the elongated body, the first extension rod, and the skirt of the first jam nut from a first side of the skirt of the jam nut to an opposite diametrically opposed second side of the skirt of the jam nut and through the elongated body and the first extension rod disposed within the skirt of the jam nut, wherein the first aperture is transverse to a longitudinal axis of the elongated body and the first extension rod; and
    a first pin positionable completely through and within the first aperture to abut and prevent movement of the elongated body, the first extension rod, and the skirt of the first jam nut relative to one another.

2. The turnbuckle of claim 1, wherein the first pin comprises a spring pin.

3. The turnbuckle of claim 1, wherein the first pin is press fit within the first aperture.

4. The turnbuckle of claim 1, wherein the first extension rod is adjustable relative to the elongated body.

5. The turnbuckle of claim 1, wherein the first extension rod comprises a first bearing head opposite the external threading of the first extension rod.

6. The turnbuckle of claim 1, further comprising:
    internal threading within a second end of the elongated body;
    a second extension rod comprising external threading configured to mate with the internal threading at the second end of the elongated body;
    a second jam nut comprising internal threading and a skirt, wherein the internal threading of the second jam nut is configured to mate with the external threading of the second extension rod to tighten the second jam nut against the second end of the elongated body so that the skirt of the second jam nut is positionable about the second end of the elongated body;
    a second aperture extending through the elongated body, the second extension rod, and the skirt of the second jam nut; and
    a second pin positionable within the first aperture.

7. The turnbuckle of claim 6, wherein the second pin comprises a spring pin.

8. The turnbuckle of claim 6, wherein the second pin is press fit within the second aperture.

9. The turnbuckle of claim 6, wherein the second extension rod is adjustable relative to the elongated body.

10. The turnbuckle of claim 6, wherein the second extension rod comprises a second bearing head opposite the external threading of the second extension rod.

11. A method to adjust and lock a turnbuckle in a variable stator vane assembly, the method comprising:
    adjusting a first extension rod relative to a first end of an elongated body;
    tightening a first jam nut comprising a single component having internal threading and a skirt positioned about the first extension rod against the first end of the elongated body so that the skirt of the first jam nut is positioned about the first end of the elongated body;
    drilling a first aperture completely through the elongated body, the first extension rod, and the skirt of the first jam nut from a first side of the skirt of the jam nut to an opposite diametrically opposed second side of the skirt of the jam nut and through the elongated body and the first extension rod disposed within the skirt of the jam nut, wherein the first aperture is transverse to a longitudinal axis of the elongated body and the first extension rod; and
    positioning a first pin completely through and within the first aperture to abut and prevent movement of the elongated body, the first extension rod, and the skirt of the first jam nut relative to one another.

12. The method of claim 11, further comprising:
    adjusting a second extension rod relative to a second end of the elongated body;
    tightening a second jam nut positioned about the second extension rod against the second end of the elongated body so that a skirt of the second jam nut is positioned about the second end of the elongated body;
    drilling a second aperture through the elongated body, the second extension rod, and the skirt of the second jam nut; and
    positioning a second pin within the second aperture.

13. A variable stator vane linkage assembly, comprising:
    at least one adjustable and lockable turnbuckle, comprising:

an elongated body comprising internal threading within a first end thereof;

a first extension rod comprising external threading configured to mate with the internal threading at the first end of the elongated body;

a first jam nut comprising a single component having internal threading and a skirt, wherein the internal threading of the first jam nut is configured to mate with the external threading of the first extension rod to tighten the first jam nut against the first end of the elongated body so that the skirt of the first jam nut is positionable about the first end of the elongated body;

a first aperture extending completely through the elongated body, the first extension rod, and the skirt of the first jam nut from a first side of the skirt of the jam nut to an opposite diametrically opposed second side of the skirt of the jam nut and through the elongated body and the first extension rod disposed within the skirt of the jam nut, wherein the first aperture is transverse to a longitudinal axis of the elongated body and the first extension rod; and a first pin positionable completely through and within the first aperture to abut and prevent movement of the elongated body, the first extension rod, and the skirt of the first jam nut relative to one another.

14. The assembly of claim 13, wherein the turnbuckle further comprises:

internal threading within a second end of the elongated body;

a second extension rod comprising external threading configured to mate with the internal threading at the second end of the elongated body;

a second jam nut comprising internal threading and a skirt, wherein the internal threading of the second jam nut is configured to mate with the external threading of the second extension rod to tighten the second jam nut against the second end of the elongated body so that the skirt of the second jam nut is positionable about the second end of the elongated body;

a second aperture extending through the elongated body, the second extension rod, and the skirt of the second jam nut; and a second pin positionable within the first aperture.

15. The assembly of claim 14, wherein the first pin and the second pin comprise a press fit spring pin.

16. The assembly of claim 14, wherein the skirt of the first jam nut is staked about the first aperture and the skirt of the second jam nut is staked about the second aperture.

* * * * *